United States Patent [19]
Tajima et al.

[11] Patent Number: 5,645,138
[45] Date of Patent: Jul. 8, 1997

[54] DILATANT FLUID-SEALED VIBRATION-INSULATING DEVICE

[75] Inventors: Hitoshi Tajima, Ichinomiya; Takashi Maeno, Aichi-ken, both of Japan

[73] Assignee: Toyoda Gosei Co., Ltd., Aichi-ken, Japan

[21] Appl. No.: 665,374

[22] Filed: Jun. 19, 1996

[30] Foreign Application Priority Data

Jun. 19, 1995 [JP] Japan .................................. 7-176813
Jun. 21, 1995 [JP] Japan .................................. 7-179567
Jun. 21, 1995 [JP] Japan .................................. 7-179568

[51] Int. Cl.$^6$ .................................................. F16F 13/00
[52] U.S. Cl. ..................... 180/300; 267/140.11; 180/312
[58] Field of Search .................................. 180/291, 300, 180/312, 299; 123/198 E; 267/35, 140.11; 248/550

[56] References Cited

U.S. PATENT DOCUMENTS

| | | | |
|---|---|---|---|
| 4,637,584 | 1/1987 | Takehara | 180/300 |
| 4,842,258 | 6/1989 | Misaka et al. | 180/300 |
| 4,852,533 | 8/1989 | Doncker et al. | |
| 4,865,299 | 9/1989 | Goto | 180/300 |
| 4,893,797 | 1/1990 | Le Fol et al. | 180/300 |
| 4,896,867 | 1/1990 | Schyboll et al. | 180/300 |
| 5,145,156 | 9/1992 | Muramatsu et al. | 180/300 |

FOREIGN PATENT DOCUMENTS 5-73335  10/1993  Japan.

*Primary Examiner*—Richard M. Camby
*Attorney, Agent, or Firm*—Cushman Darby & Cushman IP Group of Pillsbury Madison & Sutro LLP

[57] ABSTRACT

A dilatant fluid-sealed vibration-insulating device includes a connection member to be connected to one member, a holder to be connected to another member, an insulator provided between the connection member and the holder, the insulator being made of a rubber-like elastic material, a main chamber and an auxiliary chamber serially provided below the insulator. A partition plate separates the main chamber and the auxiliary chamber from each other. An orifice is formed in the partition plate to communicate the main chamber and the auxiliary chamber with each other. An air chamber is provided into which the air is introduced. A diaphragm separates the air chamber from the auxiliary chamber, and a dilatant fluid is sealed in the main chamber and the auxiliary chamber. When vibrations having very low frequency of about 5Hz and a relatively large amplitude are inputted to the vibration-insulating device, the dilatant fluid exhibits a relatively small viscosity increase insufficient to dampen the vibrations. The fluid comprises dilatant fluid of which frequency range exhibiting the dilatancy thereof is shifted toward a frequency higher than the very low frequency of about 5Hz.

13 Claims, 10 Drawing Sheets

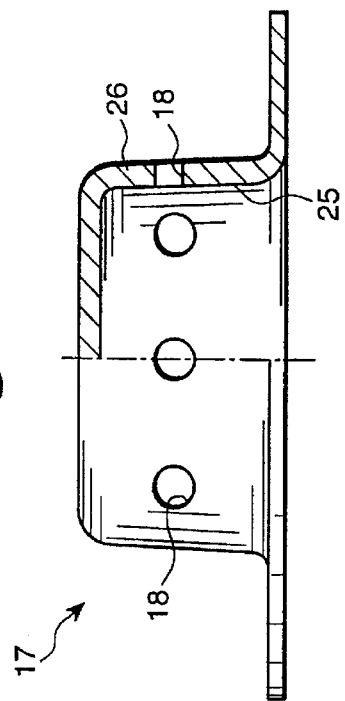
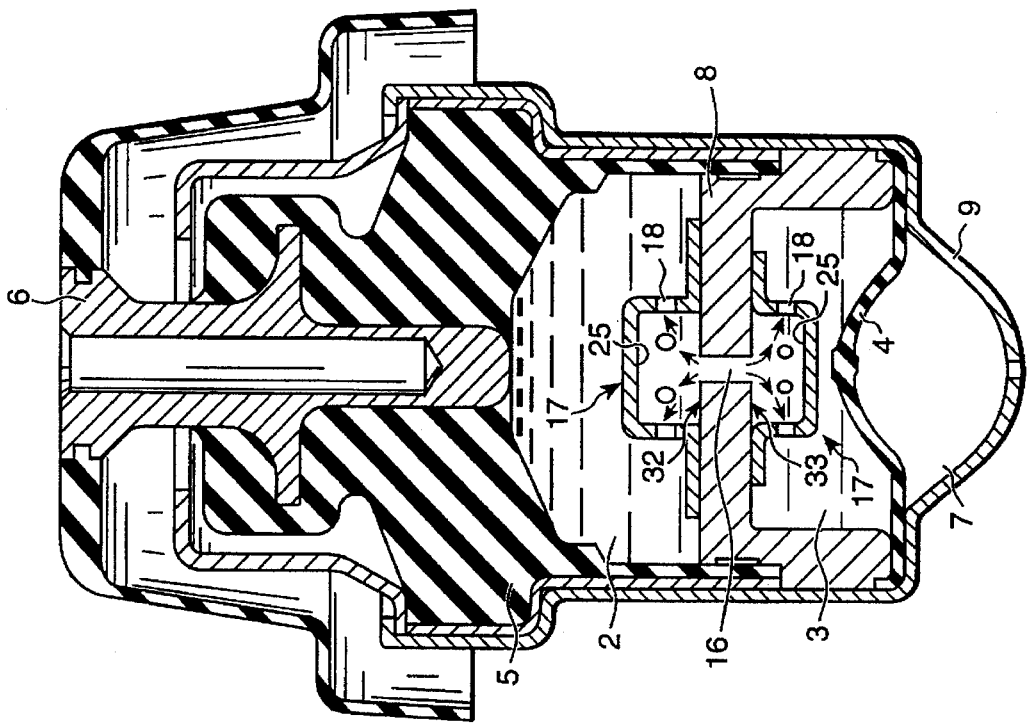

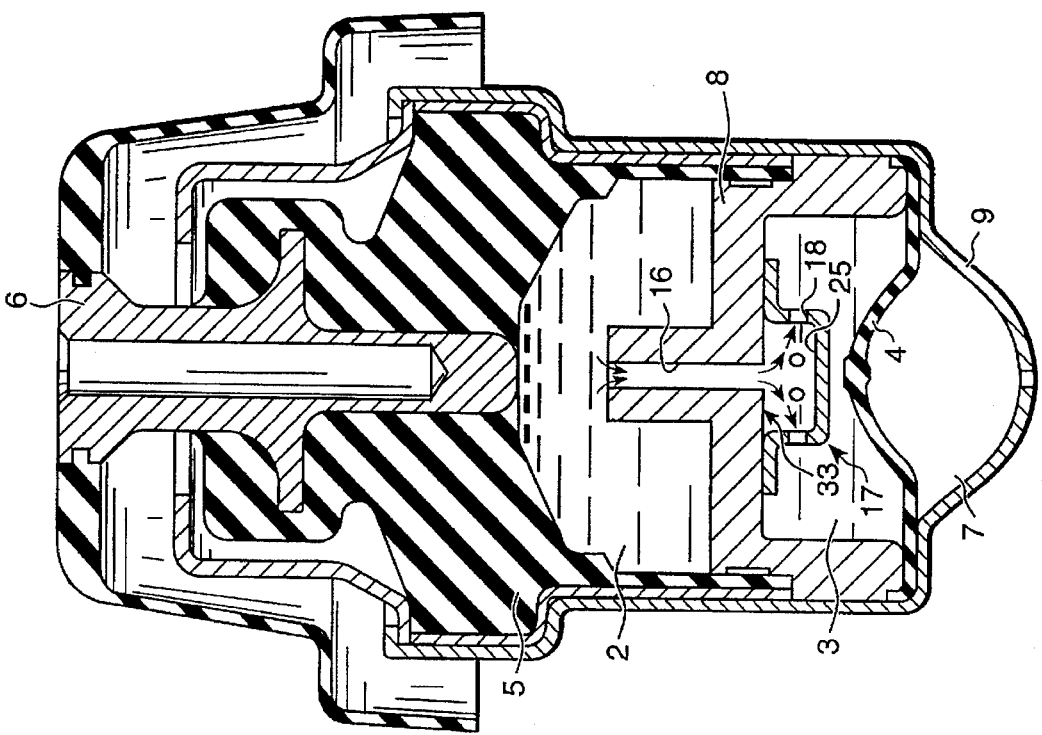
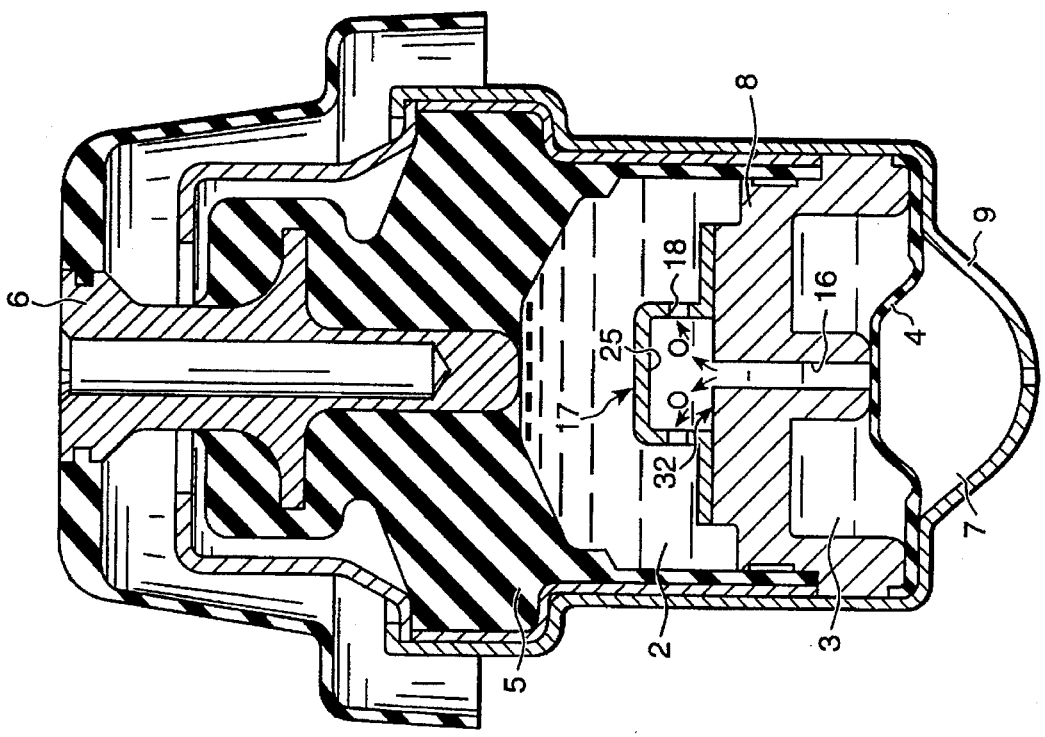

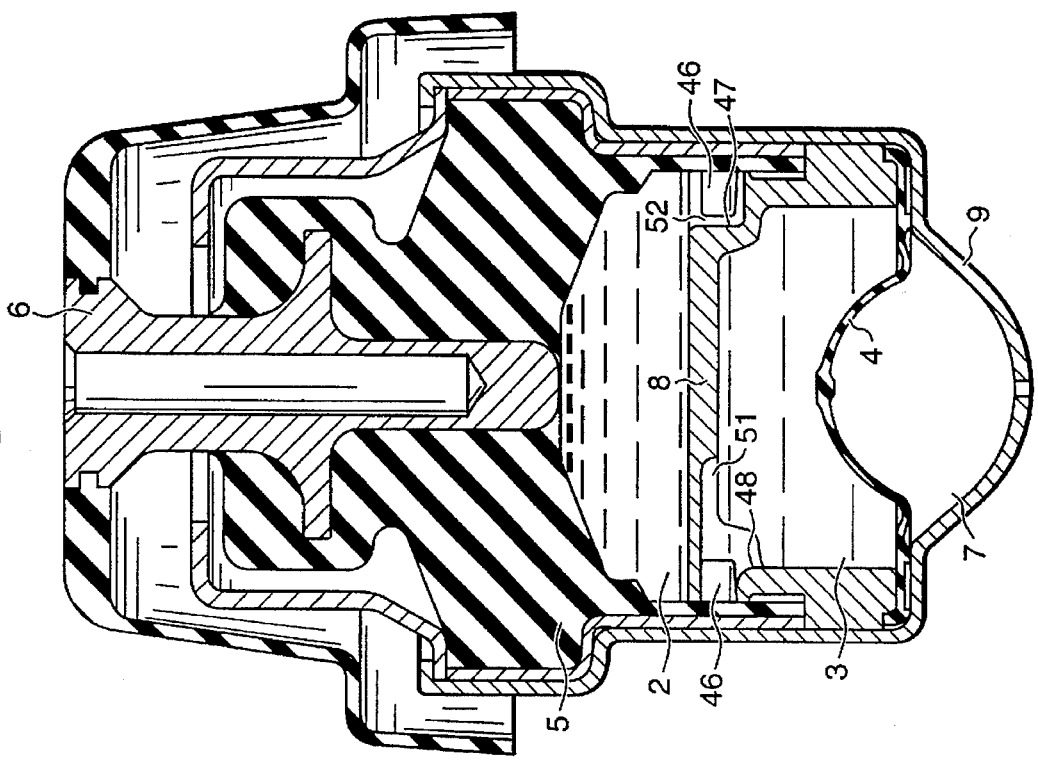
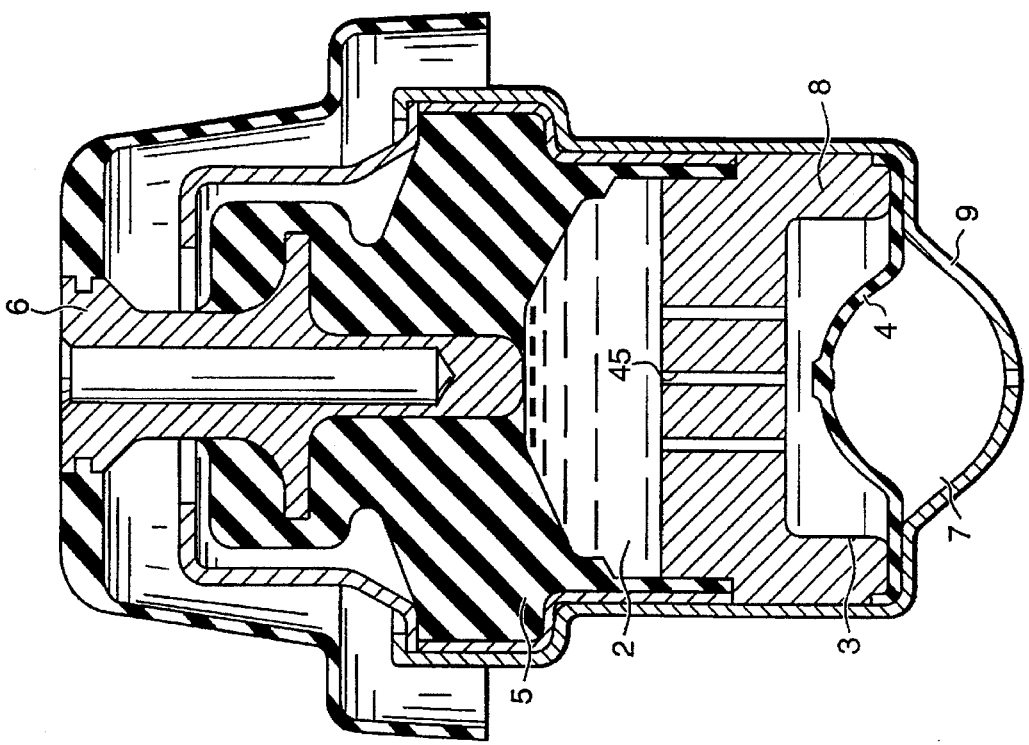

1

DILATANT FLUID-SEALED VIBRATION-INSULATING DEVICE

BACKGROUND OF THE INVENTION

The present invention relates generally to a vibration-insulating device used for mounting an engine, and more particularly to a fluid-sealed vibration-insulating device for engine mounting purposes in which a dilatant fluid is sealed.

A vibration-insulating device for an engine mount must prevent "idling vibration" from developing when vibrations of an engine in an idling condition are transmitted to a vehicle body, and also must prevent "shaking" from developing when the engine resonates with vibrations of tires during the travel of the vehicle. One example of a conventional vibration-insulating device for preventing such vibrations is a fluid-sealed vibration-insulating device (shown in FIG. 1) in which two liquid chambers, provided within the device, communicate with each other through an orifice. More specifically, this fluid-sealed vibration-insulating device includes a connection member 60 for mounting on an engine, a cup-shaped holder 90 for mounting on a member on a vehicle body, an insulator 50 of vibration-insulating rubber or the like provided between the connection member 60 and the holder 90, a main chamber 20 and an auxiliary chamber 30 (in which a non-compressive fluid is sealed) provided below the insulator 50, an annular orifice 10 communicating the main and auxiliary chambers 20 and 30 with each other, an air chamber 70 into which air is introduced, and a diaphragm 40 separating the air chamber 70 from the auxiliary chamber 30. The vibration of the engine during idling, that is, vibration having a frequency of about 30 Hz and a relatively small amplitude (0.05~0.1 mm), is prevented from being transmitted to the vehicle body by a low dynamic spring constant of the insulator 50, thereby preventing the idling vibration. The vibrations of the tires during the travel of the vehicle, that is, vibration having a frequency of about 10 Hz and a relatively medium amplitude (0.1~0.5 mm), is prevented from being transmitted to the engine by a damping effect of the orifice, thereby preventing shaking of the vehicle.

In newer automobiles, however, vibration of the engine having a very low frequency of about 5 Hz (which is lower than those of the above idling vibration and shaking) has become a serious problem. The very low-frequency (about 5 Hz) engine vibrations develop, for example, during the cranking of the engine and when abruptly starting and accelerating the automobile, and have a relatively large amplitude (0.5~5.0 mm). The above conventional fluid-sealed vibration-insulating device cannot prevent the transmission of such very low-frequency, large-amplitude vibrations.

A vibration-insulating device for preventing the transmission of very low-frequency, relatively large-amplitude vibrations is proposed in U.S. Pat. No. 4,852,533. This vibration-insulating device comprises a plurality of first thin plates fixedly secured to a vibrating member, a plurality of second thin plates each fixedly secured to a support member, and interposed between respective adjacent ones of the first thin plates, and a dilatant fluid filled in a gap between any two adjacent ones of the thin plates. When very low-frequency (about 5 Hz), relatively large-amplitude vibrations are applied to this vibration-insulating device, the dilatant fluid is subjected to a shearing force by the first and second thin plates, and its viscosity (dilatancy) is abruptly increased. This increased viscosity prevents the transmission of the very low-frequency, relatively large-amplitude vibrations.

Although this vibration-insulating device can prevent the transmission of very low-frequency (about 5 Hz), relatively large-amplitude vibrations, it cannot sufficiently prevent the transmission of high-frequency (about 30 Hz), relatively small-amplitude vibrations and the transmission of low-frequency (about 10 Hz), relatively medium-amplitude vibrations. Further, this vibration-insulating device is extremely complicated in construction.

SUMMARY OF THE INVENTION

It is therefore an object of the present invention to provide a fluid-sealed vibration-insulating device for engine mounting purposes which prevents the transmission of high-frequency (about 30 Hz), relatively small-amplitude (0.05~0.1 mm) vibrations, low-frequency (about 10 Hz), relatively medium-amplitude (0.1~0.5 mm) vibrations and very low-frequency (about 5 Hz), relatively large-amplitude (0.5~5.0 mm) vibrations, and which is simple in construction.

According to the present invention, there is provided a dilatant fluid-sealed vibration-insulating device comprising:

a connection member to be connected to one member;

a holder to be connected to another member;

an insulator provided between the connection member and the holder, the insulator being made of a rubber-like elastic material;

a main chamber and an auxiliary chamber serially provided below the insulator;

a partition plate separating the main chamber and the auxiliary chamber from each other;

an orifice formed in the partition plate to communicate the main chamber and the auxiliary chamber with each other;

an air chamber into which the air is introduced;

a diaphragm separating the air chamber from the auxiliary chamber; and a dilatant fluid sealed in the main chamber and the auxiliary chamber.

The dilatant fluid is prepared so as to exhibit it dilatancy when it receives shearing during flowing in the orifice by an input of the very low frequency (about 5 Hz), relatively large-amplitude (0.5~5.0 mm) vibrations to the vibration-insulating device.

In a case where the dilatancy of the dilatant fluid which is exhibited when the fluid receives shearing during flowing in the orifice by an input of the very low frequency (about 5 Hz), relatively large-amplitude (0.5~5.0 mm) vibrations to the vibration-insulating device is insufficient to damp the vibrations, an embodiment of the vibration-insulating device of the invention includes a piston which reciprocatingly moves together with the connection member to compress the dilatant fluid between the piston and the partition plate. In this case, upon application of the very low-frequency (about 5 Hz), relatively large-amplitude (0.5~mm) vibrations, the piston abruptly compresses the dilatant fluid, so that the viscosity of the dilatant fluid abruptly increases. As a result, the transmission of the very low-frequency (about 5 Hz), relatively large-amplitude (0.5~mm) vibrations is suppressed. Low-frequency (about 10 Hz), relatively medium-amplitude (0.1~0.5 mm) vibrations are suppressed by a damping effect achieved by the dilatant fluid flowing in the orifice, and high-frequency (about 30 Hz), relatively small-amplitude (0.05~0.1 mm) vibrations are suppressed by the insulator.

Other embodiments of the vibration-insulating device of the invention include a resistance portion for imparting resistance to flow of the dilatant fluid between the main chamber and the auxiliary chamber. The resistance portion is formed by one of an impingement chamber provided at an outlet of the orifice, a plurality of through holes extending transversely with respect to the orifice, a mesh member provided in a cavity formed in the partition plate, a mesh member provided in the orifice, and a plurality of through holes extending vertically through the partition plate. In these embodiments, the dilatant fluid is subjected to a larger shearing force in the resistance portion, so that the viscosity of the dilatant fluid abruptly increases. As a result, the transmission of the vibrations, having a very low frequency of about 5 Hz and a relatively large amplitude, is suppressed. Low-frequency (about 10 Hz), relatively medium-amplitude (0.1~0.5 mm) vibrations are suppressed by a damping effect achieved by the dilatant fluid flowing in the orifice, and high-frequency (about 30 Hz), relatively small-amplitude (0.05~0.1 mm) vibrations are suppressed by the insulator.

In a case where a range of the frequency in which the dilatancy of the dilatant fluid is exhibited is shifted toward a frequency higher than the very low frequency (about 5 Hz), in other words, in a case where low frequency (about 10 Hz) middle-amplitude vibrations are to be suppressed in the orifice, another embodiment of the vibration-insulating device of the invention is provided. This embodiment includes a pool formed at at least one of a main chamber-side outlet and an auxiliary chamber-side outlet of the orifice, and has a flow passage area larger than a flow passage area of the orifice. The orifice communicates with a corresponding one of the main chamber and the auxiliary chamber through the pool which allows the dilatant fluid to smoothly flow into and out of the orifice. In this case, the high-frequency (about 30 Hz), relatively small-amplitude (0.05~01 mm) vibrations are suppressed by the insulator, and the very low-frequency (about 5 Hz), relatively large-amplitude (0.5~5.0 mm) vibrations are suppressed by the abrupt viscosity increase of the dilatant fluid. The pool suppresses the increase of the viscosity of the dilatant fluid, and therefore the low-frequency (about 10 Hz), relatively medium-amplitude (0.1~0 5 mm) vibrations are suppressed by the damping effect achieved by the dilatant fluid flowing in the orifice.

The present invention provides a dilatant fluid-sealed vibration-insulating device for engine mounting purposes which prevents the transmission of high-frequency (about 30 Hz), relatively small-amplitude (0.05~01 mm) vibrations, low-frequency (about 10 Hz), relatively medium-amplitude (0.1~05mm) vibrations and very low-frequency (about 5 Hz), relatively large-amplitude (0.5~5.0 mm) vibrations, and which is simple in construction.

BRIEF DESCRIPTION OF THE DRAWINGS

FIG. 8 is a vertical cross-sectional view of a 3rd embodiment of a dilatant fluid-sealed vibration-insulating device of the invention;

FIG. 9 is a front-elevational view of a cap used in the 3rd embodiment of the invention;

FIG. 10 is a vertical cross-sectional view of a modified form of the 3rd embodiment of the invention;

FIG. 11 is a vertical cross-sectional view of another modified form of the 3rd embodiment of the invention;

FIG. 17 is a vertical cross-sectional view of a portion of a 7th embodiment of a dilatant fluid-sealed vibration-insulating device of the invention;

FIG. 18 is a vertical cross-sectional view of an 8th embodiment of a dilatant fluid-sealed vibration-insulating device of the invention;

DESCRIPTION OF THE PREFERRED EMBODIMENTS

Dilatant fluid-sealed vibration-insulating devices, embodying the present invention, will now be described with reference to the drawings.

Figure 20:
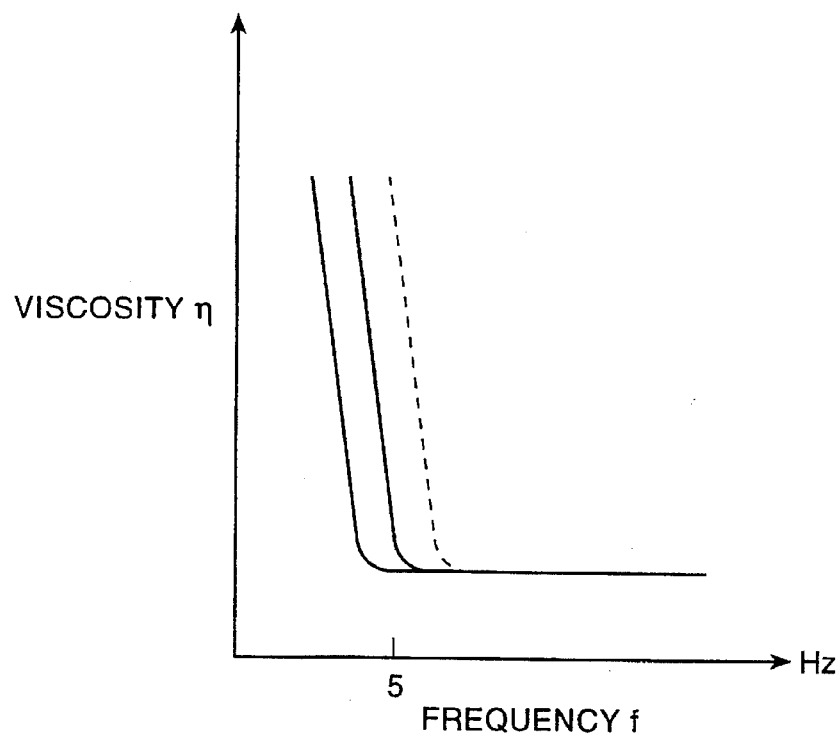
FIG. 20 is a graph showing a relationship between the viscosity of the dilatant fluid used in the present invention and the frequency applied thereto.

First, referring to FIG. 20, a relationship between the viscosity of the dilatant fluid used in the present invention and the frequency applied thereto is shown. In the graph, a thin line shows the viscosity characteristic relative to the vibration frequency of the dilatant fluid suitable for the 1st–7th embodiments of the invention and a broken line shows one suitable for the 8th embodiment of the invention. The dilatant fluid used in the invention includes colloidal silica dispersed in water and exhibits an abrupt viscosity increase when it is subjected to vibrations of a frequency below approximately 5 Hz.

Figure 2:
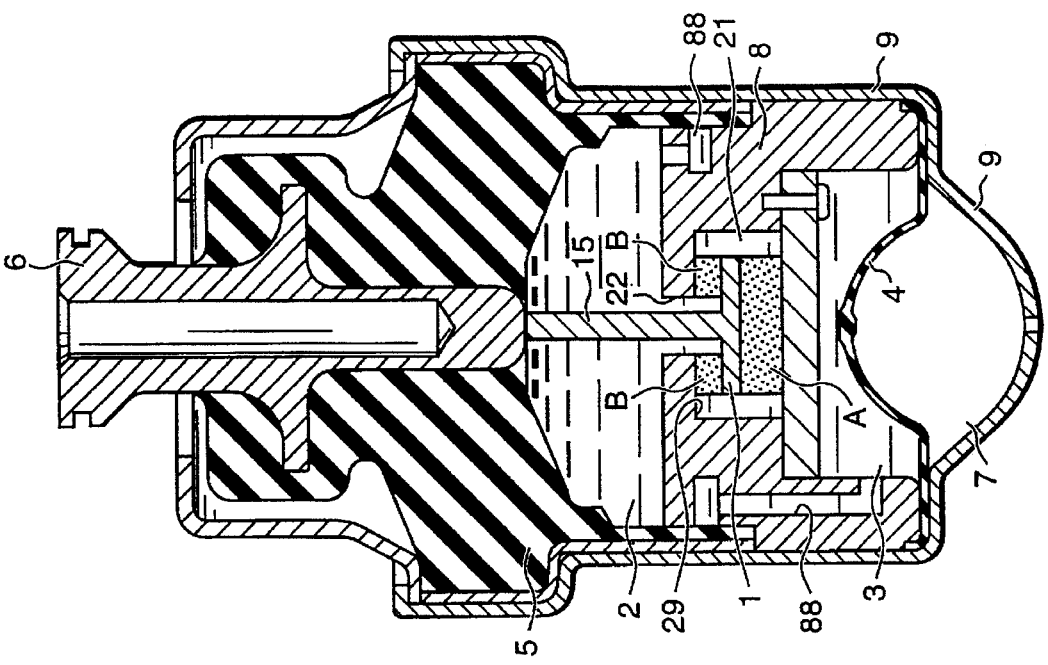
FIG. 2 is a vertical cross-sectional view of a 1st embodiment of a dilatant fluid-sealed vibration-insulating device of the invention.

A first embodiment of the invention will now be described with reference to FIG. 2. As shown in FIG. 2, the vibration-insulating device of this embodiment includes a connection member 6 to be connected to a vibrating member such as an engine, a holder 9 to be connected to a member mounted on a vehicle body, an insulator 5 of rubber or a rubber-like elastic material provided between the connection member 6 and the holder 9, a main chamber 2 and an auxiliary chamber 3 which are provided serially below the insulator 5, and have a dilatant fluid sealed therein, a partition plate 8 separating the main chamber 2 and the auxiliary chamber 3 from each other, an annular orifice 88 which is formed in the partition plate 8, and communicates the main chamber 2 and the auxiliary chamber 3 with each other, an air chamber 7 into which the air is introduced, and a diaphragm 4 separating the air chamber 7 from the auxiliary chamber 3.

In this embodiment, sealed in the main and auxiliary chambers 2 and 3 is the dilatant fluid of which dilatancy resulting by the shearing applied during flowing in the orifice when very low-frequency (around 5 Hz), relatively large-amplitude vibrations are input to the vibration-insulating device is insufficient to dampen the vibrations.

As shown in FIG. 2, a pocket-like cylinder chamber 21 is formed in that portion of the partition plate 8 disposed inwardly of the orifice 88 in adjacent relation to the main chamber 2 having the dilatant fluid sealed therein. A passage 22 is formed through that portion of the partition plate 8 disposed between the main chamber 2 and the cylinder chamber 21 to communicate the chambers so that the dilatant fluid in the main chamber 2 can flow into and out of the cylinder chamber 21. A piston 1 is provided within the cylinder chamber 21 so as to compress the dilatant fluid in the cylinder chamber 21. This piston 1 is connected to the connection member 6 through a rod 15. Therefore, the piston 1 vibrates in response to vibrations transmitted from the engine on which the connection member 6 is mounted.

Figure 1:
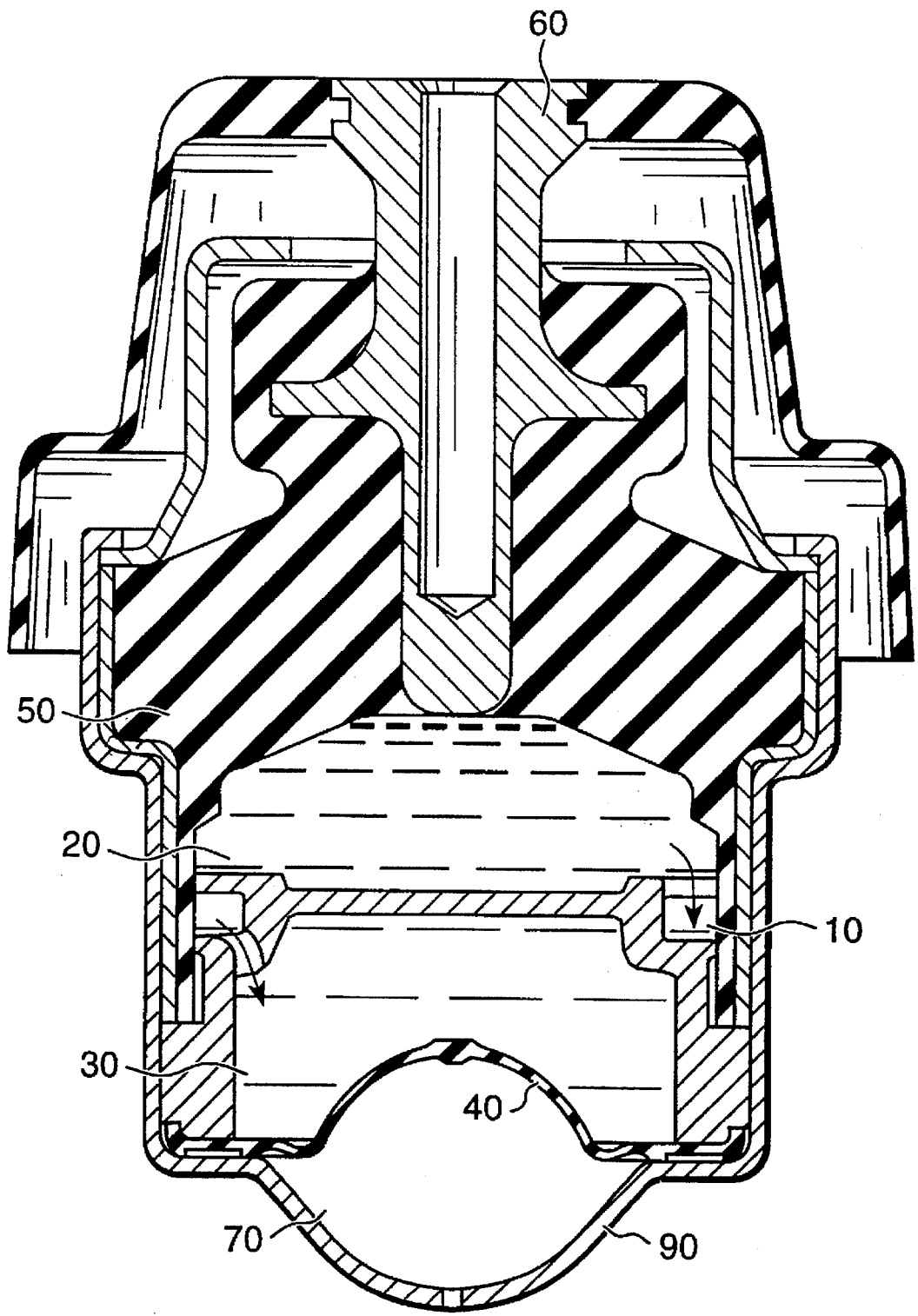
FIG. 1 is a vertical cross-sectional view of a conventional fluid-sealed vibration-insulating device.
Figure 3:
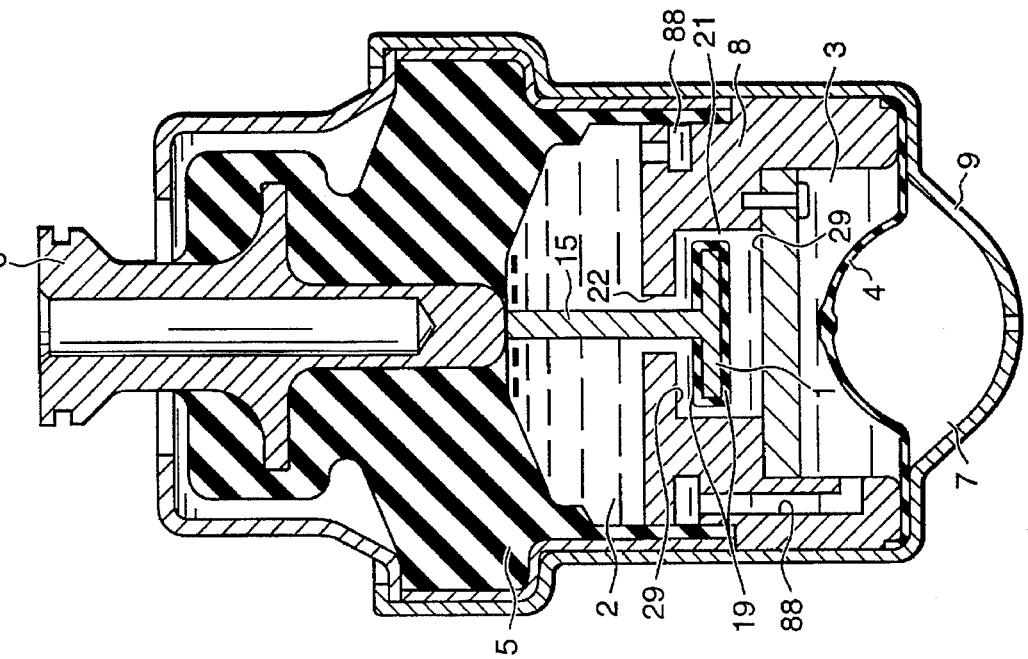
FIG. 3 is a vertical cross-sectional view of a modified form of the 1st embodiment of the invention.

As shown in FIG. 3, a stopper 19, made of rubber or a rubber-like elastic material, may be mounted on the piston 1 to cover the same. The stopper 19 serves as a cushioning member when the amplitude of vibrations from the vibrating member (engine) becomes so large that the piston 1 strikes against upper and lower surfaces 29 and 29' respectively of the cylinder chamber 21. Therefore, the stopper 9 may be replaced by a pair of stopper members fixedly secured respectively to the upper and lower surfaces 29 and 29' of the cylinder chamber 21.

The operation of the first embodiment of the above construction will now be described. When the dilatant fluid-sealed vibration-insulating device is mounted between the vibrating member (e.g. engine) and the vehicle body, vibrations from the vibrating member or the vehicle body are transmitted to the insulator 5 through the connection member 6 or the holder 9. Among the thus transmitted vibrations, high-frequency, relatively small-amplitude vibrations, which cause the idling vibration, are absorbed and interrupted by the insulator 5. Low-frequency (about 10 Hz), relatively medium-amplitude vibrations, which cause shaking, are absorbed and interrupted by a damping effect of the dilatant fluid flowing in the orifice 88.

When very low-frequency (around 5 Hz), relatively large-amplitude vibrations are inputted from the vibrating member to the connection member 6, these vibrations are transmitted through the rod 15 to the piston 1 provided within the cylinder chamber 21. The piston 1 vibrates upwardly and downwardly within the cylinder chamber 21, and those portions of the dilatant fluid, present respectively in pressure-receiving regions A and B formed respectively on the lower and upper sides of the piston 1, are abruptly compressed, so that the dilatant fluid present in the pressure-receiving regions A and B abruptly increases its viscosity. As a result, the movement of the piston 1 in the upward and downward directions is limited, and therefore the movement of the connection member 6 (which is connected to the piston 1) in the upward and downward directions is limited. Namely, this produces the same effect as obtained when the spring constant of the connection member 6 in the upward and downward directions becomes large. With this effect, the very low-frequency (around 5 Hz), relatively large-amplitude vibrations are suppressed.

In the construction shown in FIG. 3 in which the stopper 19 of rubber or rubber-like elastic material is mounted on the piston 1 to cover the same, the stopper 1 performs the function of a mechanical stopper between the upper and lower surfaces 29 and 29' of the cylinder chamber 21, and thus performs the function of an internal stopper. Therefore, in the construction of FIG. 3, there is no need to provide any external stopper comprising a stabilizer and a stopper.

Figure 4:
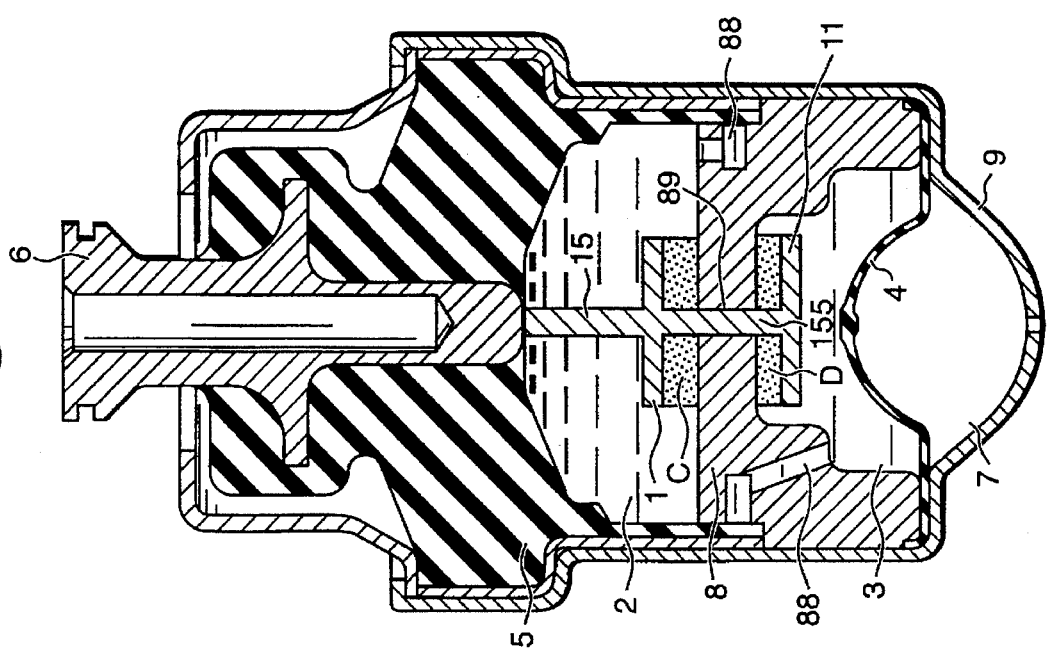
FIG. 4 is a vertical cross-sectional view of a 2nd embodiment of a dilatant fluid-sealed vibration-insulating device of the invention.

A second embodiment of the invention will now be described with reference to FIG. 4. The second embodiment is identical in basic construction to the first embodiment, but differs therefrom in that two pistons 1 and 11 for compressing a dilatant fluid are provided in a main chamber 2 and an auxiliary chamber 3, respectively, as shown in FIG. 4. More specifically, a dilatant fluid-compressing portion of this embodiment comprises a rod 15 connected to a connection member 6, the piston (main piston) 1 which is connected to one end of the rod 15, and is provided in the main chamber 2, and the piston (auxiliary piston) 11 which is connected to the main piston 1 through a connecting rod 155, and is provided in the auxiliary chamber 3.

In the embodiment of FIG. 4, there is not provided any particular cylinder chamber or the like containing the pistons 1 and 11. A through hole 89 is formed through a central portion of a partition plate 8 to communicate the main chamber 2 and the auxiliary chamber 3 with each other. The connecting rod 155 extends through the through hole 89. When very low-frequency, large-amplitude vibrations are inputted from a vibrating member to the connection member 6, the main piston 1 and the auxiliary piston 11 vibrate (or operate) in the main chamber 2 and the auxiliary chamber 3, respectively.

When the two pistons 1 and 11 are thus operated, those portions of the dilatant fluid, which are present respectively in a region C between the piston 1 and the partition plate 8 and a region D between the piston 11 and the partition plate 8, are compressed to abruptly increase their viscosity. As a result, the very low-frequency (around 5 Hz), large-amplitude vibrations are suppressed.

Figure 5:
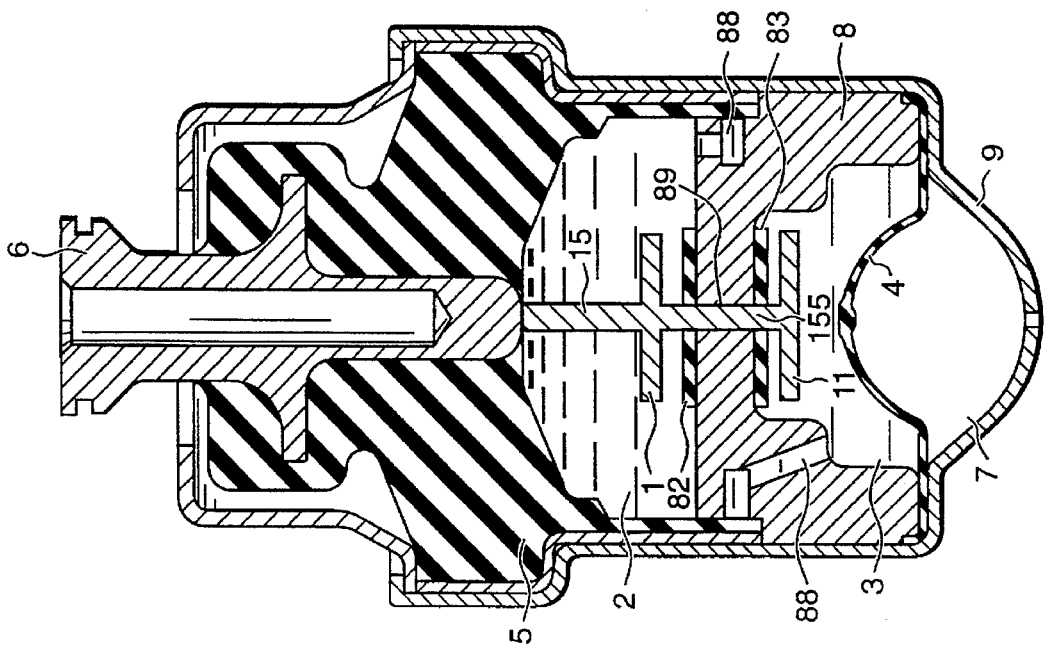
FIG. 5 is a vertical cross-sectional view of a modified form of the 2nd embodiment of the invention.

As shown in FIG. 5, stoppers 82 and 83 made of rubber or a rubber-like elastic material may be provided. More specifically, the stopper 82 is mounted on that portion of the upper surface (exposed to the main chamber 2) of the partition plate 8 which cooperates with the piston 1 to compress the dilatant fluid, and similarly the stopper 83 is mounted on that portion of the lower surface (exposed to the auxiliary chamber 3) of the partition plate 8 which cooperates with the piston 11 to compress the dilatant fluid. The stoppers 82 and 83 cooperate respectively with the pistons 1 and 11 to perform the function of an internal stopper, and therefore there is no need to provide any external stopper mechanism comprising a stabilizer or the like. Instead of being mounted on the partition plate 8 as shown in FIG. 5, the stoppers 82 and 83 may be mounted respectively on those surfaces or sides of the pistons 1 and 11 facing the partition plate 8.

Figure 7:
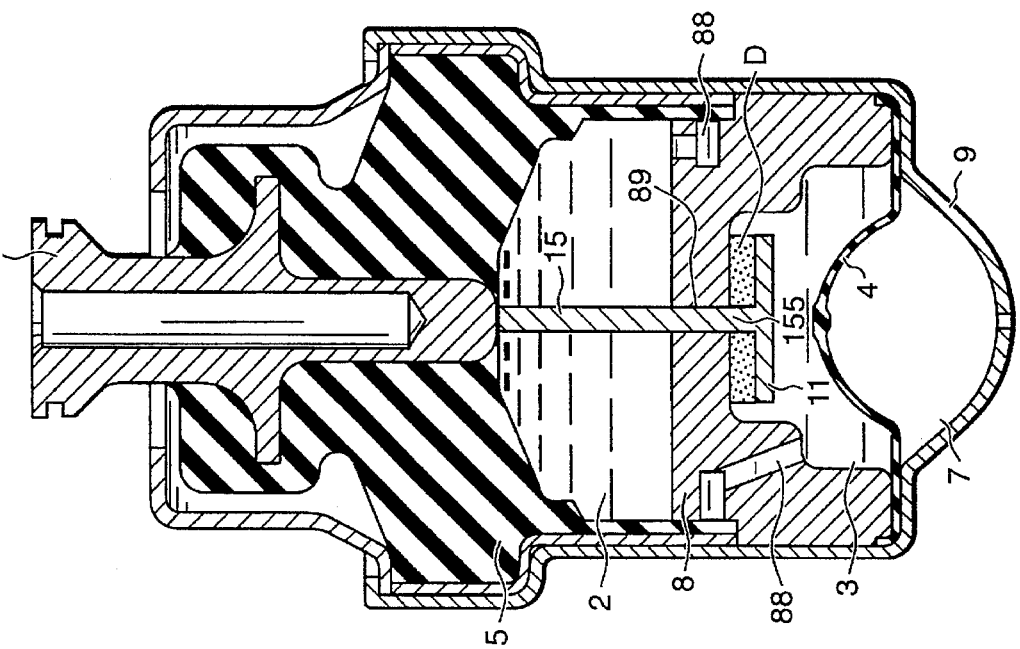
FIG. 7 is a vertical cross-sectional view of a further modified form of the 2nd embodiment of the invention.
Figure 6:
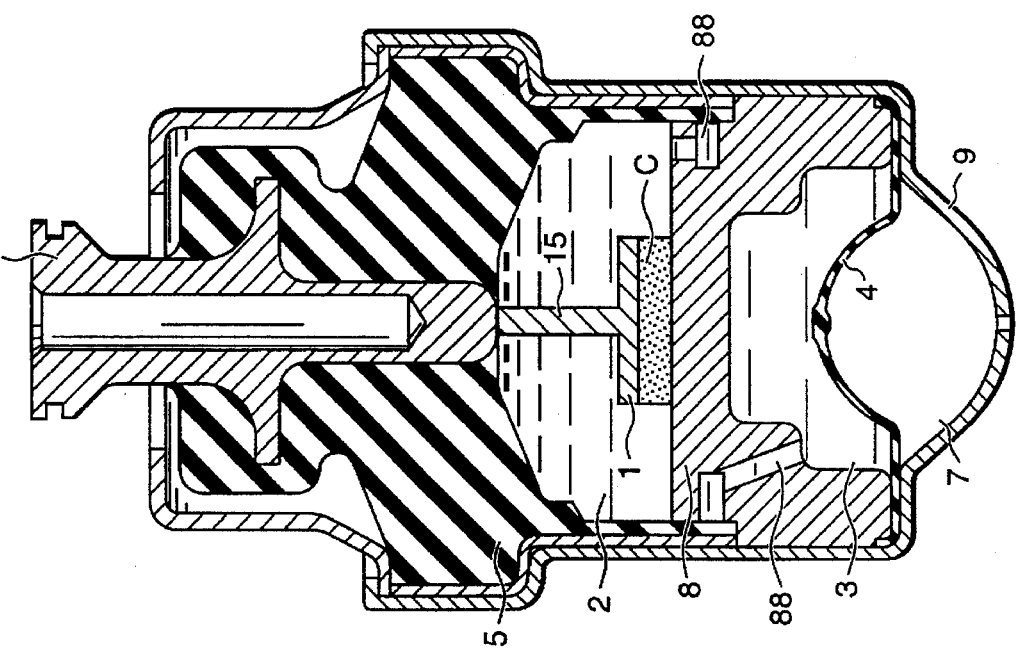
FIG. 6 is a vertical cross-sectional view of another modified form of the 2nd embodiment of the invention.

In the second embodiment shown in FIG. 4, although the vibration-insulating effect is exerted both in the directions of compression and extension of the vibration-insulating device, the vibration-insulating effect may be exerted only in the direction of compression (as shown in FIG. 6) or in the direction of extension (as shown in FIG. 7). In the modified form shown in FIG. 6, the auxiliary piston of FIG. 2 is not provided, and in the modified form shown in FIG. 7, the main piston of FIG. 2 is not provided.

A third embodiment of the invention will now be described with reference to FIGS. 8 and 9. A vibration-insulating device of the third embodiment includes a connection member 6 to be connected to a vibrating member such as an engine, a holder 9 to be connected to a member mounted on a vehicle body, an insulator 5 of rubber or a rubber-like elastic material provided between the connection member 6 and the holder 9, a main chamber 2 and an auxiliary chamber 3 which are provided serially below the insulator 5, and have a dilatant fluid sealed therein, a partition plate 8 separating the main chamber 2 and the auxiliary chamber 3 from each other, an orifice 16 which is formed through the partition plate 8, and communicates the main chamber 2 and the auxiliary chamber 3 with each other, an air chamber 7 into which air is introduced, and a diaphragm 4 separating the air chamber 7 from the auxiliary chamber 3.

In this embodiment, sealed in the main and auxiliary chambers 2 and 3 is the dilatant fluid of which dilatancy resulting by the shearing applied during flowing in the orifice when very low-frequency (around 5 Hz), relatively large-amplitude vibrations are input to the vibration-insulating device is insufficient to dampen the vibrations.

The orifice 16 through which the dilatant fluid flows is formed vertically straight through a central portion of the partition plate 8 as shown in FIG. 8. A cap 17 of a hat-profile is mounted on that portion (hereinafter referred to as "main chamber-side outlet portion) 32 of the partition plate 8 surrounding one end of the orifice 16 which is open to the main chamber 2. Similarly, another cap 17 of a hat-profile is mounted on that portion (hereinafter referred to as " auxiliary chamber-side outlet portion) 33 of the partition plate 8 surrounding the other end of the orifice 16 which is open to the auxiliary chamber 3. As shown in FIG. 9, each of the caps 17 of a hat-profile defines an internal space, and when each cap 17 is fixedly secured to a respective one of the main chamber-side outlet portion 32 and the auxiliary chamber-side outlet portion 33, the internal spaces define, together with the outlet portion 32, 33, impingement chambers 25. A plurality of through holes 18, having a small flow passage area, are formed through a peripheral or side wall of each cap 17. The sum of the flow passage areas of the plurality of through holes 18 is not less than the flow passage area of the orifice 16.

The operation of the third embodiment will now be described. When the dilatant fluid-sealed vibration-insulating device is mounted between the vibrating member (e.g. engine) and the vehicle body, vibrations from the vibrating member or the vehicle body are transmitted to the insulator 5 through the connection member 6 or the holder 9. Among the thus propagated vibrations, high-frequency, small-amplitude vibrations, which cause the idling vibration, are absorbed and interrupted by the insulator 5. Low-frequency (about 10 Hz), medium-amplitude vibrations, which cause shaking, are absorbed and interrupted by a predetermined damping effect of the dilatant fluid flowing in the orifice 16. Since the sum of the flow passage areas of the through holes 18 in each cap 17 is not less than the flow passage area of the orifice 16, the flow of the fluid will not be obstructed.

When the dilatant fluid, excited by the very low-frequency (around 5 Hz), large-amplitude vibrations, flows from the orifice 16 to the main chamber-side outlet portion 32 or the auxiliary chamber-side outlet portion 33, the direction of flow of the dilatant fluid is turned or changed approximately 90° there. Then, the dilatant fluid is directed toward the through holes (small openings) 18 as indicated by the arrows in FIG. 8. With this sequential flow effect, the flow of the fluid is rendered to be turbulent in the impingement chamber 25, so that the fluid is subjected to a large shearing force. As a result, the dilatant fluid within the impingement chamber 25 exhibits abrupt viscosity increase. Therefore, the spring constant (spring property) of the vibration-insulating device of this embodiment becomes large, and this enhanced spring property suppresses the very low-frequency (around 5 Hz), large-amplitude vibrations.

In the third embodiment shown in FIG. 8, although the vibration-insulating effect is exerted both in the directions of compression and extension of the vibration-insulating device, the vibration-insulating effect may be exerted only in the direction of extension (as shown in FIG. 10) or in the direction of compression (as shown in FIG. 11). In the modified form shown in FIG. 10, the cap 17 is mounted only on the main chamber-side outlet portion 32 so that the vibration-insulating effect can be exerted only in the direction of extension of the vibration-insulating device. In the modified form shown in FIG. 11, the cap 17 is mounted only on the auxiliary chamber-side outlet portion 33 so that the vibration-insulating effect can be exerted only in the direction of compression of the vibration-insulating device.

A fourth embodiment of a dilatant fluid-sealed vibration-insulating device of the invention will now be described with reference to FIGS. 12 to 15.

Figure 13:
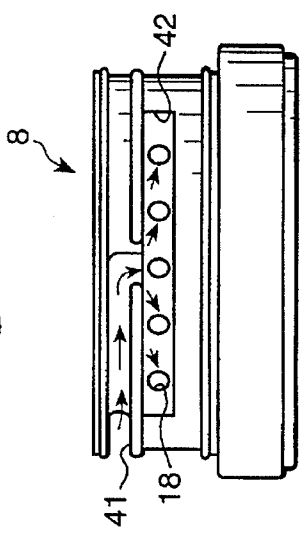
FIG. 13 is a side-elevational view of a partition plate used in the 4th embodiment of the invention.
Figure 14:
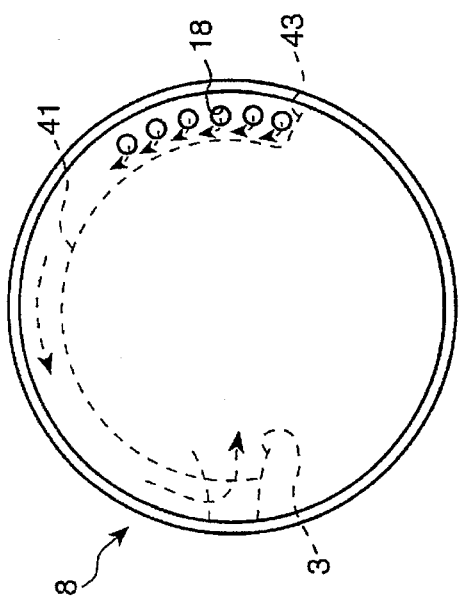
FIG. 14 is a top plan view of the partition plate used in the 4th embodiment of the invention.

The fourth embodiment is identical in basic construction to the third embodiment, but differs therefrom in the configurations of an orifice and an impingement chamber. In the fourth embodiment, the orifice 41 of a generally semi-circular shape (or generally annular shape) is formed in an outer peripheral surface of a partition plate 8 in a circumferential direction, and a main chamber-side end portion 43 of the orifice 41 communicates with a main chamber 2 through a plurality of through holes 18 extending in a direction perpendicular to the orifice 41. The main chamber-side end portion 43 and the plurality of through holes 18 constitute the impingement chamber which performs its function when the vibrating-insulating device is extended axially, as will more fully be described later. The sum of flow passage areas of the plurality of through holes 18 is not less than the flow passage area of the orifice 41. As shown in FIG. 13, an auxiliary chamber-side end portion of the orifice 41 communicates with an impingement chamber 42 of an arcuate shape formed in the outer peripheral surface of the partition plate 8 in the circumferential direction, and the impingement chamber 42 communicates with an auxiliary Chamber 3 through a plurality of through holes 18'. As described above for the plurality of the through holes 18, the sum of flow passage areas of the plurality of through holes 18' is not less than the flow passage area of the orifice 41. A sealed dilatant fluid is the same as used in the third embodiment.

When the dilatant fluid-sealed vibration-insulating device of the fourth embodiment is mounted between an engine and a vehicle body, vibrations from the engine or the vehicle body are transmitted to an insulator 5 through a connection member 6 or a holder 9. Among the thus transmitted vibrations, high-frequency, small-amplitude vibrations, which cause the idling vibration, are absorbed and interrupted by the insulator 5. Low-frequency (about 10 Hz), medium-amplitude vibrations, which cause shaking, are absorbed and interrupted by a damping effect of the dilatant fluid flowing in the orifice 41. At this time, since the sum of the flow passage areas of the plurality of through holes 18, as well as the sum of the flow passage areas of the plurality, of through holes 18', is not less than the flow passage area of the orifice 41, the flow of the fluid is not obstructed.

Very low-frequency (about 5 Hz), large-amplitude vibrations are absorbed and interrupted as follows. When the vibration-insulating device operates in the compressing direction, the dilatant fluid in the main chamber 2 flows through the orifice 41, and is turned approximately 90° to flow into the impingement chamber 42, and is further turned approximately 90° to flow into the auxiliary chamber 3 through the through holes 18'. When the vibration-insulating device operates in the extension direction, the dilatant fluid in the auxiliary chamber 3 flows through the orifice 41, and is turned approximately 90° at the main chamber-side end portion 43 to flow into the main chamber 2 through the through holes 18. With this sequential flow, the flow of the fluid becomes turbulent at the impingement chamber 42 and at the main chamber-side end portion 43, so that the fluid is subjected to a large shearing force. As a result, the viscosity of the dilatant fluid increases. Therefore, the spring constant (spring property) of the vibration-insulating device becomes large, and this enhanced spring property suppresses the very low-frequency (around 5 Hz), large-amplitude vibrations.

Figure 12:
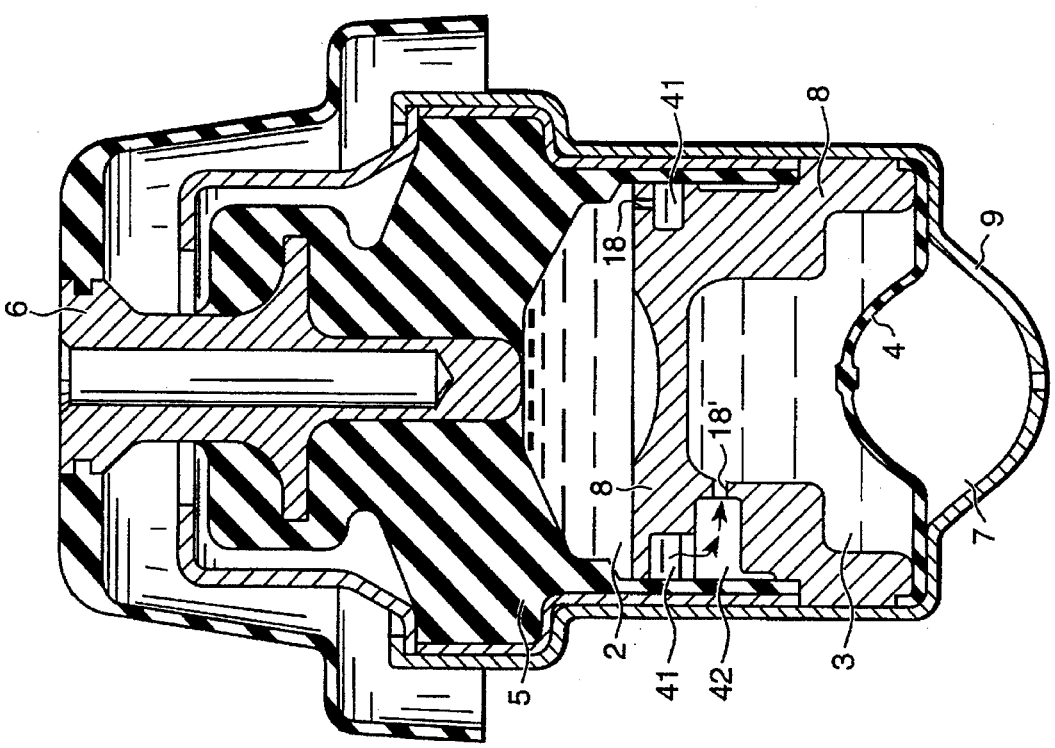
FIG. 12 is a vertical cross-sectional view of a 4th embodiment of a dilatant fluid-sealed vibration-insulating device of the invention.

In the embodiment shown in FIG. 12, although the impingement chamber 42 is provided only at the auxiliary chamber-side end portion of the orifice 41, such impingement chambers may be provided both at the main chamber-side end portion and the auxiliary chamber-side end portion, respectively, and if necessary, the impingement chamber may be provided only at the main chamber-side end portion. In the embodiment of FIG. 12, although the through holes 18 are provided only at the main chamber-side end portion of the orifice 41, such through holes may be provided at each of the main chamber-side end portion and the auxiliary chamber-side end portion, and if necessary, the through holes 18 may be provided only at the auxiliary chamber-side end portion.

Figure 15:
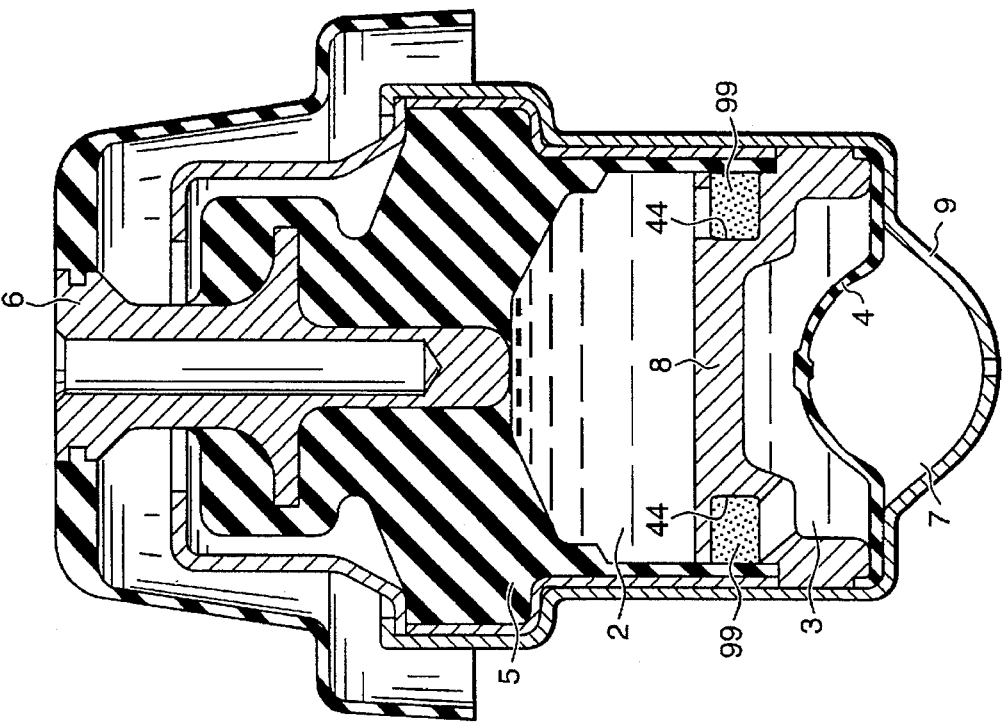
FIG. 15 is a vertical cross-sectional view of a portion of a 5th embodiment of a dilatant fluid-sealed vibration-insulating device of the invention.

A fifth embodiment of a dilatant fluid-sealed vibration-insulating device of the invention will now be described with reference to FIG. 15.

The fifth embodiment is identical in basic construction to the third embodiment, but differs therefrom in the configuration of orifices and the arrangement for imparting a shearing force to a dilatant fluid. In the fifth embodiment, a cavity (or internal space) 86 is formed in a partition plate 8 separating a main chamber 2 and an auxiliary chamber 3 from each other, and a mesh member 99 composed of steel wool or the like fills the cavity 86. A plurality of through holes 87 are formed through a wall 84 of the partition plate 8 facing the main chamber 2, and a plurality of through holes 87' are formed through a wall 85 facing the auxiliary chamber 3. The sum of the flow passage areas of the plurality of through holes 87 is so determined as to achieve a predetermined damping effect for the flow of the dilatant fluid caused by low-frequency, medium-amplitude vibrations which are higher in frequency and smaller in amplitude than very low-frequency, large-amplitude vibrations. The Sum of these flow passage areas is equivalent to the flow passage area of the orifice 16 of the third embodiment. The through holes 87 and 87' constitute the orifice. Similarly, the sum of flow passage areas of the plurality of through holes 87' is so determined as to achieve a predetermined damping effect for the flow of the dilatant fluid caused by low-frequency, medium-amplitude vibrations which are higher in frequency and smaller in amplitude than very low-frequency, large-amplitude vibrations. The sealed dilatant fluid is the same as used in the above embodiments.

When the dilatant fluid-sealed vibration-insulating device of the fifth embodiment is mounted between an engine and a vehicle body, vibrations from the engine or the vehicle body are transmitted to an insulator 5 through a connection member 6 or a holder 9. Among the thus transmitted vibrations, high-frequency (about 30 Hz), small-amplitude vibrations, which cause the idling vibration, are absorbed and interrupted by the insulator 5. Low-frequency (about 10 Hz), medium-amplitude vibrations, which cause shaking, are absorbed and interrupted by the damping effect of the dilatant fluid flowing through the through holes 87 and 87' constituting the orifices.

Very low-frequency (about 5 Hz), large-amplitude vibrations are absorbed and interrupted as follows. When the vibration-insulating device operates in the compressing direction, the dilatant fluid in the main chamber 2 flows into the cavity 86 through the through holes 87, and further flows into the auxiliary chamber 3 through the through holes 87' while receiving a large resistance from the mesh member 99. When the vibration-insulating device operates in the extension direction, the dilatant fluid in the auxiliary chamber 3 flows into the cavity 86 through the through holes 87', and further flows into the main chamber 2 through the through holes 87 while receiving a large resistance from the mesh member 99. With this sequential flow, the fluid is made turbulent at the region where the mesh member 99 is provided, and is subjected to a large shearing force. As a result, the viscosity of the dilatant fluid is abruptly increased. Therefore, the spring constant (spring property) of the vibration-insulating device becomes large, and this enhanced spring property suppresses the very low-frequency (around 5 Hz), large-amplitude vibrations.

Figure 16:
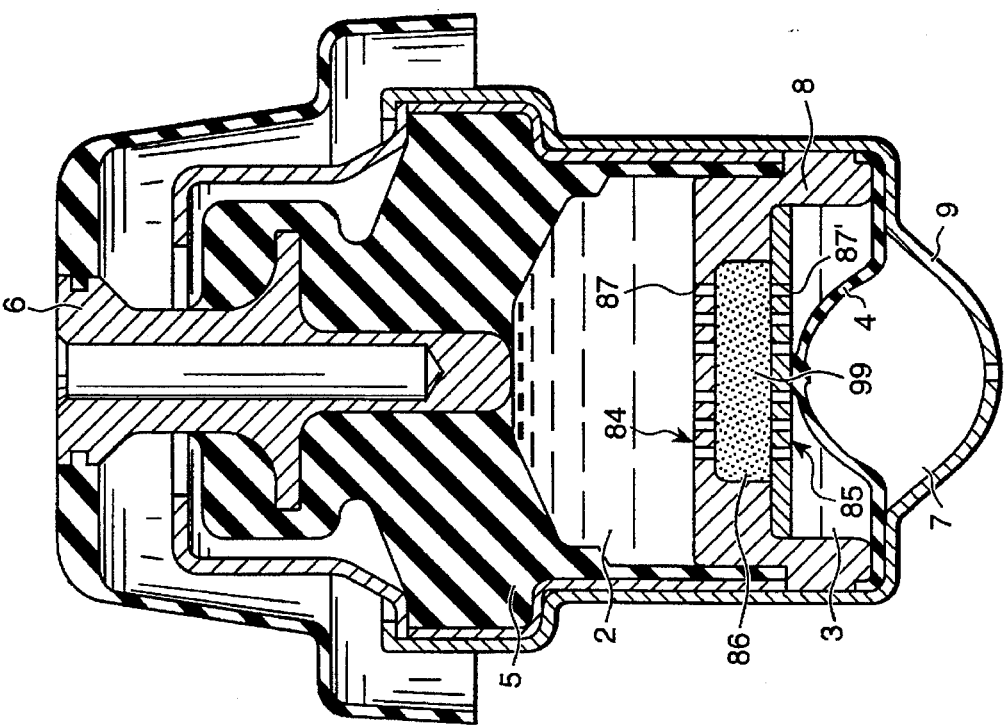
FIG. 16 is a vertical cross-sectional view of a portion of a 6th embodiment of a dilatant fluid-sealed vibration-insulating device of the invention.

A sixth embodiment of a dilatant fluid-sealed vibration-insulating device of the invention will now be described with reference to FIG. 16.

The sixth embodiment is identical in basic construction to the fourth embodiment, but differs therefrom in the arrangement for imparting a shearing force to a dilatant fluid. In the sixth embodiment, an orifice 44 of an annular shape is formed in an outer peripheral surface of a partition plate 8 in a circumferential direction. The partition plate 8 separates a main chamber 2 and an auxiliary chamber 3 from each other. The orifice 44 is in communication with the main chamber 2 and the auxiliary chamber 3. The orifice 44 has such a flow passage area as to achieve a predetermined damping effect for the flow of the dilatant fluid caused by low-frequency, medium-amplitude vibrations. A mesh member 99, composed of steel wool or the like, is provided in the orifice 44. The sealed dilatant fluid is the same as used in the above embodiments.

When the dilatant fluid-sealed vibration-insulating device of the sixth embodiment is mounted between an engine and a vehicle body, vibrations from the engine or the vehicle body are transmitted to an insulator 5 through a connection member 6 or a holder 9. Among the thus transmitted vibrations, high-frequency (about 30 Hz), small-amplitude vibrations, which cause the idling vibration, are absorbed and interrupted by the insulator 5. Low-frequency (about 10 Hz), medium-amplitude vibrations, which cause shaking, are absorbed and interrupted by the damping effect of the dilatant fluid flowing in the orifice 44.

Very low-frequency (about 5 Hz), large-amplitude vibrations are absorbed and interrupted as follows. When the vibration-insulating device operates in the compressing direction, the dilatant fluid in the main chamber 2 flows into the auxiliary chamber 3 through the orifice 44. When the vibration-insulating device operates in the extension direction, the dilatant fluid in the auxiliary chamber 3 flows into the main chamber 2 through the orifice 44. The dilatant fluid, when passing through the orifice 44, receives a large resistance from the mesh member 99, and therefore is made to be turbulent flow, so that the dilatant fluid is subjected to a large shearing force. As a result, the viscosity of the dilatant fluid is increased. Therefore, the spring constant (spring property) of the vibration-insulating device becomes large, and this enhanced spring property suppresses the very low-frequency (around 5 Hz), large-amplitude vibrations.

A seventh embodiment of a dilatant fluid-sealed vibration-insulating device of the invention will now be described with reference to FIG. 17.

The seventh embodiment is identical in basic construction to the fifth embodiment, but differs therefrom in the arrangement for imparting a shearing force to a dilatant fluid. In the seventh embodiment, a plurality of orifices 45 are formed through a partition plate 8 which separates a main chamber 2 and an auxiliary chamber 3 from each other, and the main chamber 2 and the auxiliary chamber 3 communicate with each other through the orifices 45. The plurality of orifices 45 are defined respectively by straight holes extending vertically (i.e., in an upward-downward direction) through the partition plate 8. A flow passage area of the orifices 45 is so determined that the dilatant fluid can exhibit dilatancy when very low-frequency (about 5 Hz), large-amplitude vibrations are inputted to the vibrating insulation device, and that a predetermined damping effect can be achieved for the flow of the dilatant fluid caused by low-frequency, medium-amplitude vibrations.

When the dilatant fluid-sealed vibration-insulating device of the seventh embodiment is mounted between an engine and a vehicle body, vibrations from the engine or the vehicle body are transmitted to an insulator 5 through a connection member 6 or a holder 9. Among the thus transmitted vibrations, high-frequency (about 30 Hz), small-amplitude vibrations, which cause the idling vibration, are absorbed and interrupted by the insulator 5. Low-frequency (about 10 Hz), medium-amplitude vibrations, which cause shaking, are absorbed and interrupted by the damping effect of the dilatant fluid flowing in the orifices 45. The dilatant fluid, when passing through the orifices 45, is increased in viscosity, so that the spring constant (spring property) of the vibration-insulating device becomes large, thereby suppressing very low-frequency (about 5 Hz), large-amplitude vibrations.

Figure 19:
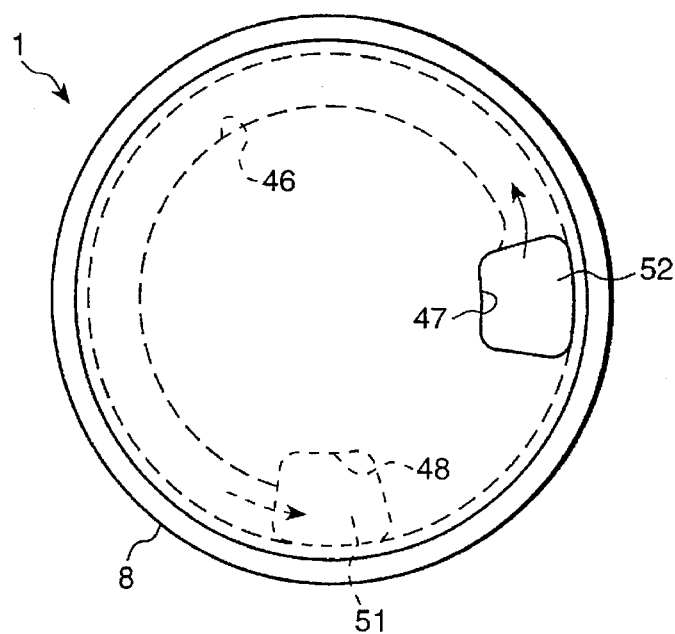
FIG. 19 is a top plan view of a partition plate used in the 8th embodiment of the invention.

An eighth embodiment of a dilatant fluid-sealed vibration-insulating device of the invention will now be described with reference to FIGS. 18 and 19.

The eighth embodiment is identical in basic construction to the above embodiments. The vibration-insulating device of this embodiment includes a connection member 6 to be connected to a vibrating member such as an engine, a holder 9 to be connected to a member mounted on a vehicle body, an insulator 5 of rubber or a rubber-like elastic material provided between the connection member 6 and the holder 9, a main chamber 2 and an auxiliary chamber 3 which are provided serially below the insulator 5, and have a dilatant fluid sealed therein, a partition plate 8 separating the main chamber 2 and the auxiliary chamber 3 from each other, an orifice 46 which is formed in the partition plate 8, and communicates the main chamber 2 and the auxiliary chamber 3 with each other, an air chamber 7 into which the air is introduced, and a diaphragm 4 separating the air chamber 7 from the auxiliary chamber 3. The sealed dilatant fluid is different from the dilatant fluid used in the above embodiments, and it is fluid of which frequency range exhibiting dilatancy thereof is shifted toward high frequency rather than the very low frequency (about 5 Hz) as shown by the broken line in FIG. 20. The orifice 46 of a generally annular shape is formed in an outer peripheral surface of the partition plate 8 in a circumferential direction. The orifice 46 communicates with the main chamber 2 through a pool 52 comprising a trumpet-shaped opening 47, and also communicates with the auxiliary chamber 3 through a pool 51 comprising a trumpet-shaped opening 48. The orifice 46 has such a flow passage area as to increase the viscosity of the dilatant fluid when the dilatant fluid is caused to flow by very low-frequency (about 5 Hz), large-amplitude vibrations. Each of the openings 47 and 48 has a larger flow passage area than that of the Orifice 46 and serves to smoothly make the fluid flow into and out of the orifice.

When the dilatant fluid-sealed vibration-insulating device of the eighth embodiment is mounted between an engine and a vehicle body, vibrations from the engine or the vehicle body are transmitted to the insulator 5 through the connection member 6 or the holder 9. Among the thus transmitted vibrations, high-frequency, small-amplitude vibrations, which cause the idling vibration, are absorbed and interrupted by the insulator 5.

Low-frequency (about 10 Hz), medium-amplitude vibrations, which cause shaking, are absorbed and interrupted as follows. When such low-frequency, medium-amplitude vibration are inputted to the vibration-insulating device, the dilatant fluid in the main chamber 2 flows into the pool 52, and also the dilatant fluid in the auxiliary chamber 3 flows into the pool 51. The amplitude of the vibrations is relatively medium, and therefore the amount of dilatant fluid flowing from the main chamber 2 into the pool 52, as well as the amount of dilatant fluid flowing from the auxiliary chamber 3 into the pool 51, is relatively small. Therefore, the dilatant fluid, residing in the pool 51, 52, is caused by the inflow dilatant fluid to flow into the orifice 46. As a result, the dilatant fluid smoothly flows through the orifice 46 without causing any turbulence, thereby achieving a predetermined damping effect. With this damping effect, the low-frequency, medium-amplitude vibrations are absorbed and interrupted.

The sealed dilatant fluid presents viscosity increase when very low-frequency (around 5 Hz), large-amplitude vibrations are inputted to the vibration-insulating device, and therefore upon reception of such very low-frequency (about 5 Hz), large-amplitude vibrations, the viscosity of the dilatant fluid increases, thereby increasing the spring constant (spring property) of the vibration-insulating device. The very low-frequency (about 5 Hz), large-amplitude vibrations are suppressed by this enhanced spring property.

While the invention has been described in connection with what is presently considered to be the most practical and preferred embodiments, it is understood that the invention is not limited to the disclosed embodiments but, on the contrary, is intended to cover various modification and equivalent arrangements included within the spirit and scope of the appended claims.

What is claimed is:

1. A dilatant fluid-sealed vibration-insulating device comprising:

a connection member constructed and arranged to be connected to one member;

a holder disposed generally opposite to the connecting member and constructed and arranged to be connected to another member;

an insulator provided between said connection member and said holder, said insulator being made of an elastic material;

a main chamber and an auxiliary chamber serially provided below said insulator;

a partition plate separating said main chamber from said auxiliary chamber;

an orifice formed in said partition plate communicating said main chamber with said auxiliary chamber;

an air chamber adjacent said auxiliary chamber and open to atmosphere;

a diaphragm separating said air chamber from said auxiliary chamber;

a dilatant fluid sealed in said main chamber and said auxiliary chamber, said dilatant fluid being provided in such a manner as to exhibit a relatively small viscosity increase when vibrations, having very low frequency of approximately 5 Hz and a large amplitude are inputted to said vibration-insulating device, said viscosity increase being insufficient to dampen said vibrations; and a piston connected to said connection member for reciprocal movement therewith so as to compress the dilatant fluid between said piston and said partition plate thereby suppressing said very low-frequency large-amplitude vibrations, said orifice having a flow passage area so as to achieve a predetermined damping effect for a flow of the dilatant fluid caused by low-frequency, medium-amplitude vibrations which are higher in frequency and smaller in amplitude than said very low-frequency, large-amplitude vibrations.

2. A vibration-insulating device according to claim 1, wherein said piston is provided for reciprocating movement within a generally cylindrical chamber formed in said partition plate.

3. A vibration-insulating device according to claim 2, wherein a stopper of an elastic material is mounted on one of said piston and a wall portion of said partition plate which cooperates with said piston to compress the dilatant fluid.

4. A dilatant fluid-sealed vibration-insulating device comprising:

a connection member constructed and arranged to be connected to one member;

a holder disposed generally opposite to the connecting member and constructed and arranged to be connected to another member;

an insulator provided between said connection member and said holder, said insulator being made of an elastic material;

a main chamber and an auxiliary chamber serially provided below said insulator;

a partition plate separating said main chamber from said auxiliary chamber;

an orifice formed in said partition plate communicating said main chamber with said auxiliary chamber;

an air chamber adjacent said auxiliary chamber and open to atmosphere;

a diaphragm separating said air chamber from said auxiliary chamber;

a dilatant fluid sealed in said main chamber and said auxiliary chamber, said dilatant fluid being provided in such a manner as to exhibit a relatively small viscosity increase when vibrations, having very low frequency of approximately 5 Hz and a large amplitude are inputted to said vibration-insulating device, said viscosity increase being insufficient to dampen said vibrations; and a piston connected to said connection member for reciprocating movement therewith so as to compress the dilatant fluid between said piston and said partition plate thereby suppressing said very low-frequency, large-amplitude vibrations, said piston comprising a main piston provided within said main chamber, and an auxiliary piston provided within said auxiliary chamber, said orifice having a flow passage area so as to achieve a predetermined damping effect for a flow of the dilatant fluid caused by low-frequency, medium-amplitude vibrations which are higher in frequency and smaller in amplitude than said very low-frequency, large-amplitude vibrations.

5. A vibration-insulating device according to claim 4, wherein a first stopper of elastic material is mounted on one of said main piston and a wall portion of said partition plate cooperating with said main piston to compress the dilatant fluid, and a second stopper of elastic material is mounted on one of said auxiliary piston and a wall portion of said partition plate cooperating with said auxiliary piston to compress the dilatant fluid.

6. A dilatant fluid-sealed vibration-insulating device comprising:

a connection member constructed and arranged to be connected to one member;

a holder disposed generally opposite to the connecting member and constructed and arranged to be connected to another member;

an insulator provided between said connection member and said holder, said insulator being made of an elastic material;

a main chamber and an auxiliary chamber serially provided below said insulator;

a partition plate separating said main chamber from said auxiliary chamber;

an orifice formed in said partition plate communicating said main chamber with said auxiliary chamber;

an air chamber adjacent said auxiliary chamber and open to atmosphere;

a diaphragm separating said air chamber from said auxiliary chamber;

a dilatant fluid sealed in said main chamber and said auxiliary chamber, said dilatant fluid being provided in such a manner as to exhibit a relatively small viscosity increase when vibrations, having very low frequency of approximately 5 Hz and a large amplitude are inputted to said vibration-insulating device, said viscosity increase being insufficient to dampen said vibrations; and a resistance portion for imparting a resistance to a flow of the dilatant fluid between said main chamber and said auxiliary chamber thereby suppressing said very low-frequency, large-amplitude vibrations.

7. A vibration-insulating device according to claim 6, wherein said orifice extends straight through said partition plate, and has a flow passage area so as to achieve a predetermined damping effect for a flow of the dilatant fluid caused by low-frequency, medium-amplitude vibrations which are higher in frequency and smaller in amplitude than said very low-frequency, large amplitude vibrations;

the device further including a cap, having a hat shaped profile, mounted on at least one of a main chamber-side orifice outlet portion of said partition plate and an auxiliary chamber-side orifice outlet portion of said partition plate in such a manner that said cap forms an impingement chamber for changing a direction of flow of the dilatant fluid;

a plurality of through holes being formed through a peripheral wall of said cap; a sum of flow passage areas of said plurality of through holes being not less than a flow passage area of said orifice; and said impingement chamber providing said resistance portion.

8. A vibration-insulating device according to claim 6, wherein said orifice has a generally annular shape and is formed in and extends along an outer peripheral surface of said partition plate, said orifice having a flow passage area so as to achieve a predetermined damping effect for a flow of the dilatant fluid caused by low-frequency, medium-amplitude vibrations which are higher in frequency and smaller in amplitude than said very low-frequency, large-amplitude vibrations; at least one of a main chamber-side outlet portion and an auxiliary chamber-side outlet portion of said orifice communicating with an impingement chamber, the impingement chamber being formed in and extending along the outer peripheral surface of said partition plate; said impingement chamber communicating with a corresponding one of said main chamber and said auxiliary chamber through a plurality of through holes; a sum of flow passage areas of said plurality of through holes being not less than the flow passage area of said orifice; and said impingement chamber providing said resistance portion.

9. A vibration-insulating device according to claim 6, wherein said orifice has a generally annular shape and is formed in and extends along an outer peripheral surface of said partition plate, said orifice having a flow passage area so as to achieve a predetermined damping effect for a flow of the dilatant fluid caused by low-frequency, medium-amplitude vibrations which are higher in frequency and smaller in amplitude than said very low-frequency, large-amplitude vibrations; at least one of a main chamber-side outlet portion and an auxiliary chamber-side outlet portion of said orifice communicating with a corresponding one of said main chamber and said auxiliary chamber through a plurality of through holes extending in a direction perpendicular to a said orifice; a sum of flow passage areas of said plurality of through holes being not less than the flow passage area of said orifice; said plurality of through holes providing said resistance portion.

10. A vibration-insulating device according to claim 6, wherein said partition plate has a cavity formed therein; said cavity communicates with said main chamber through a plurality of first through holes, and also communicates with said auxiliary chamber through a plurality of second through holes; said orifice is defined by said first and second through holes; a sum of flow passage areas of said plurality of first through holes, as well as a sum of flow passage areas of said plurality of second through holes, is so determined as to achieve a predetermined damping effect for a flow of the dilatant fluid caused by low-frequency, medium-amplitude vibrations which are higher in frequency and smaller in amplitude than said very low-frequency, large-amplitude vibrations; and said resistance portion is provided by a mesh member disposed in said cavity.

11. A vibration-insulating device according to claim 6, wherein said orifice has a generally annular shape, and is formed in and extends along an outer peripheral surface of said partition plate, and has a flow passage area so as to achieve a predetermined damping effect for a flow of the dilatant fluid caused by low-frequency, medium-amplitude vibrations which are higher in frequency and smaller in amplitude than said very low-frequency, large-amplitude vibrations; and said resistance portion is provided by a mesh member disposed in said orifice.

12. A dilatant fluid-sealed vibration-insulating device comprising:

a connection member constructed and arranged to be connected to one member;

a holder disposed generally opposite to the connecting member and constructed and arranged to be connected to another member;

an insulator provided between said connection member and said holder, said insulator being made of an elastic material;

a main chamber and an auxiliary chamber serially provided below said insulator;

a partition plate separating said main chamber from said auxiliary chamber;

an orifice formed in said partition plate communicating said main chamber with said auxiliary chamber;

an air chamber adjacent said auxiliary chamber and open to atmosphere;

a diaphragm separating said air chamber from said auxiliary chamber; and a dilatant fluid sealed in said main chamber and said auxiliary chamber, said dilatant fluid being provided in such a manner as to exhibit a relatively small viscosity increase when vibrations, having very low frequency of approximately 5 Hz and a large amplitude are inputted to said vibration-insulating device, said viscosity increase being insufficient to dampen said vibrations, wherein said orifice comprises a plurality of through holes extending substantially vertically through said partition plate; a flow passage area of each of said through holes is so determined that viscosity of the dilatant fluid increases when the dilatant fluid is caused to flow by said very low-frequency, large-amplitude vibrations, and that a predetermined damping effect is achieved for a flow of the dilatant fluid caused by low-frequency, medium-amplitude vibrations which are disposed in frequency and smaller in amplitude than said very low-frequency, large-amplitude vibrations.

13. A dilatant fluid-sealed vibration-insulating device comprising:

a connection member constructed and arranged to be connected to one member;

a holder disposed generally opposite to the connecting member and constructed and arranged to be connected to another member;

an insulator provided between said connection member and said holder, said insulator being made of an elastic material;

a main chamber and an auxiliary chamber serially provided below said insulator;

a partition plate separating said main chamber from said auxiliary chamber;

an orifice formed in said partition plate communicating said main chamber with said auxiliary chamber;

an air chamber adjacent said auxiliary chamber and open to atmosphere;

a diaphragm separating said air chamber from said auxiliary chamber; and a dilatant fluid sealed in said main chamber and said auxiliary chamber, wherein said dilatant fluid comprises dilatant fluid of which range of frequency exhibiting the dilatancy thereof is shifted toward a frequency higher than a very low frequency of about 5 Hz; said orifice has a generally annular shape, and is formed in and extends along an outer peripheral surface of said partition plate, and has such a flow passage area as to cause a viscosity increase of the dilatant fluid when the dilatant fluid is caused to flow by said very low-frequency, large-amplitude vibrations; a pool is formed at at least one of a main chamber-side outlet and an auxiliary chamber-side outlet of said orifice, and has a flow passage area larger than the flow passage area of said orifice; and said orifice communicates with a corresponding one of said main chamber and said auxiliary chamber through said pool which allows the dilatant fluid to smoothly flow into and out of said orifice.

* * * * *